United States Patent
Balko et al.

(10) Patent No.: US 6,363,716 B1
(45) Date of Patent: *Apr. 2, 2002

(54) PLASMA FUEL PROCESSING FOR NOX CONTROL LEAN BURN ENGINES

(75) Inventors: Edward N. Balko, Middletown; Kenneth E. Voss, Somerville, both of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,594

(22) Filed: Nov. 7, 2000

Related U.S. Application Data (62) Division of application No. 09/191,697, filed on Nov. 13, 1998, now Pat. No. 6,176,078.

(51) Int. Cl.[7] .................................................. F01N 3/00
(52) U.S. Cl. ............................ 60/286; 60/274; 60/275; 60/301; 60/303; 422/183; 422/186.04; 422/186.03
(58) Field of Search ........................... 60/274, 275, 286, 60/295, 299, 301, 303; 422/182, 183, 186.03, 186.04, 186.16, 186.21

(56) References Cited

U.S. PATENT DOCUMENTS

| | | | |
|---|---|---|---|
| 4,961,917 A | 10/1990 | Byrne | |
| 5,189,876 A | 3/1993 | Hirota et al. | |
| 5,343,702 A | 9/1994 | Miyajima et al. | |
| 5,440,876 A | 8/1995 | Bayliss et al. | |
| 5,516,497 A | 5/1996 | Speronello et al. | |
| 5,586,433 A | 12/1996 | Boegner et al. | |
| 5,711,147 A | 1/1998 | Vogtlin et al. | |
| 5,715,677 A | 2/1998 | Wallman et al. | |
| 5,746,051 A | * 5/1998 | Kieser et al. | 60/275 |
| 5,746,984 A | 5/1998 | Hoard | |
| 5,767,470 A | 6/1998 | Cha | |
| 5,788,936 A | 8/1998 | Subramanian et al. | |
| 5,807,466 A | 9/1998 | Wang et al. | |
| 5,891,409 A | * 4/1999 | Hsiao et al. | 423/239.1 |
| 6,038,853 A | * 3/2000 | Penetrante et al. | 60/274 |
| 6,047,543 A | * 4/2000 | Caren et al. | 60/275 |
| 6,176,078 B1 | * 1/2001 | Balko et al. | 60/274 |

FOREIGN PATENT DOCUMENTS

| | | |
|---|---|---|
| EP | 0 366 876 B1 | 5/1993 |
| WO | WO 97/01697 | 1/1997 |

OTHER PUBLICATIONS

"Thermal Cracking of Higher Paraffins" by H.H. Voge and G.M. Good, Journal of American Chemical Society, Vol. 71, pp. 593–597, Feb. 1949.

SAE Paper No. 98 FL 577, "Plasma–Assisted Catalytic Reduction of NOX" by B. M. Penetrante, R. M. Brusasco, B. T. Merritt, W. J. Pitz, G. E. Vogtlin, K. E. Voss, C. Z. Wan, M.C. Kung, H.H. Kung, D.W. Kim, and P. W. Park, date Oct. 1998.

"Catalytic reduction system of NOX in exhaust gases from diesel engines with secondary fuel injection" by T. Nakatsuji, R. Yasukawa, K. Tabata, K. Ueda, and M. Niwa, pp. 333–345, Applied Catalysts B: Environmental 17, Aug. 1998 Elsevier Science B.V.

* cited by examiner

*Primary Examiner*—Thomas Denion
*Assistant Examiner*—Binh Tran
(74) *Attorney, Agent, or Firm*—Richard A. Negin

(57) ABSTRACT

A highly reactive reducing gas mixture is produced from vehicle fuel and introduced into the exhaust gas of an internal combustion engine operated at lean burn conditions and passed over a reducing catalyst to convert $NO_X$ emissions to benign emissions. Preferably, fuel with oxygen present in a carrier gas is metered into a plasma reactor having a bed of dielectric particles which prevent formation of coke as the fuel is reacted. The plasma induces a number of simultaneous reactions with the fuel to produce a substantial amount of oxygenated and non-oxygenated, unbranched organic molecules at relatively low temperatures that are highly reactive and ideally suited for use as a reducing agent in an SCR catalyst.

8 Claims, 5 Drawing Sheets

PLASMA FUEL PROCESSING FOR NOX CONTROL LEAN BURN ENGINES

This patent application is a division of application Ser. No. 09/191,697, filed Nov. 13, 1998, now U.S. Pat. No. 6,176,078.

This invention relates generally to a system (method and apparatus) for removing emissions from the exhaust gases of a vehicle's internal combustion engine and more particularly to the reduction of nitrogen oxides to free nitrogen.

The invention is particularly applicable to and will be described with specific reference to a system for the removal of nitrogen oxides from diesel engines operating at lean air/fuel ratios which promote the formation of $NO_X$. However, those skilled in the art will understand that the invention has broader application and could be applied, for example, to gasoline engines operated at lean burn conditions, or any engine exhaust stream containing oxygen.

INCORPORATION BY REFERENCE

The following documents are incorporated by reference so that details known to those skilled in the art may not have to be restated when explaining the invention. The following documents are not part of the present invention.

1) "Thermal Cracking of Higher Paraffins" by H. H. Voge and G. M. Good, Journal of American Chemical Society, Vol. 71, pages 593–597, February, 1949;
2) SAE paper No. 98 FL 577, "Plasma-Assisted Catalytic Reduction of $NO_X$" by B. M. Penetrante, R. M. Brusasco, B. T. Merritt, W. J. Pitz, G. E. Vogtlin, K. E. Voss, C. Z. Wan, M. C. Kung, H. H. Kung, D. W. Kim, and P. W. Park, dated October 1998;
3) "Catalytic reduction system of $NO_X$ in exhaust gases from diesel engines with secondary fuel injection" by T. Nakatsuji, R. Yasukawa, K. Tabata, K. Ueda, and M. Niwa, pages 333–345, Applied Catalysts B: Environmental Aug. 17, 1998, © Elsevier Science B.V.;
4) U.S. Pat. No. 5,440,876 to Bayliss et al., Aug. 15, 1995; U.S. Pat. No. 5,586,433 to Boegner et al., Dec. 24, 1996; U.S. Pat. No. 5,711,147 to Vogtlin et al., Jan. 27, 1998; and U.S. Pat. No. 5,788,936 to Subramanian et al., Aug. 4, 1998.

BACKGROUND

This invention is directed to the removal of nitrogen oxides, $NO_X$, from the exhaust gases of internal combustion engines, particularly diesel engines, which operate at combustion conditions with air in excess of that required for stoichiometric combustion, i.e., lean. It is well known that fuel efficiency improvements in excess of 10% can be achieved in gasoline engines operated at "lean burn" conditions when compared to today's engines which cycle the air to fuel ratio about stoichiometric. Diesel engines, by their nature, operate at lean conditions and have always achieved high fuel efficiencies.

There are numerous ways known in the art to remove $NO_X$ from a waste gas. This invention is directed to a catalytic reduction method for removing $NO_X$. A catalytic reduction method essentially comprises passing the exhaust gas over a catalyst bed in the presence of a reducing gas to convert $NO_X$ into nitrogen. Two types of catalytic reduction are practiced. The first type is non-selective catalyst reduction and the second type is selective catalyst reduction (SCR). This invention relates to SCR systems.

In the selective catalyst reduction method, a reducing agent or reductant is supplied to the exhaust stream and the mixture is then contacted with a catalyst. Typical reducing agents used in industrial processes for removal of $NO_X$ from waste streams, such as urea or ammonia, are not suited for vehicular applications because of the large quantities of the reducing agent required. Any SCR method using a separate reducing agent is simply not practical for vehicle applications. Additional storage tanks have to be provided. Also, measures have to be taken to account for the environmental affects on the reducing agent such as freezing. In addition, space limitations for the reactor have to be addressed.

The prior art has recognized the limitations present in supplying a separate reducing agent for converting $NO_X$ and has used diesel fuel itself as the reducing agent. In U.S. Pat. No. 5,343,702 to Miyajima et al., issued Sep. 6, 1994, excess fuel is injected into the combustion chambers of the engine on a sensed demand basis to provide unsaturated HC to the catalyst. In U.S. Pat. No. 5,189,876 to Hirota et al., issued Mar. 2, 1993, diesel fuel is injected into a cracking chamber formed in the exhaust manifold of the engine. In U.S. Pat. No. 5,788,936 to Subramanian et al., issued Aug. 4, 1998, a wide variety of reductants is introduced into the exhaust stream upstream of an acidic alumina catalyst which is said to be effective to reduce $NO_2$ to $N_2$. In U.S. Pat. No. 5,586,433 to Boegner et al., issued Dec. 24, 1996, a separate cracking unit for diesel fuel is supplied. The '702 and '876 patents simply inject diesel fuel into the system. Systems injecting diesel fuel, in liquid form, into the exhaust stream must include provisions for warming the fuel to overcome low temperature conditions encountered in a vehicular environment. In contrast, the '433 patent separately cracks diesel fuel with air and will produce a more reactive reducing agent. A somewhat similar concept to the '433 patent appears to be disclosed in PCT application WO 97/01697 published Jan. 16, 1997. Still further, the catalytic reduction article published by Elsevier Science, B.U., shows admission of fuel and air over a partial oxidation catalyst to form acetaldehyde and formaldehyde as a reductant.

Recently plasma techniques have been proposed for use in emission systems. The method of using plasma techniques can take various forms such as microwave, RF, and even glow discharge. However, many systems utilize corona discharge techniques to generate the plasma. Initially, it was believed that the plasma would reduce $NO_X$ to elemental nitrogen, $N_2$. (See, for example, U.S. Pat. No. 5,746,984 to Hoard, issued May 5, 1998, using a non-thermal plasma to reduce $NO_X$ and U.S. Pat. No. 5,715,677 to Wallman et al., issued Feb. 10, 1998 using a thermal plasma. See also U.S. Pat. No. 5,440,876 to Bayliss et al., issued Aug. 15, 1995) However, as explained in U.S. Pat. No. 5,711,147 to Vogtlin, issued Jan. 27, 1998, the plasma converts $NO_X$ to $NO_2$ which must then be subsequently reduced by a selective catalyst.

The $NO_X$ plasma art has also utilized a reducing agent with the plasma. In U.S. Pat. No. 5,807,466 to Wang et al., issued Sep. 15, 1998, diesel fuel is injected upstream of a $NO_X$ plasma reactor to produce $N_2$. In U.S. Pat. No. 5,767,470 to Cha, issued Jun. 16, 1998, diesel fuel is injected into the exhaust gas prior to entering a two stage microwave converter. In the '147 patent, diesel fuel is passed through a plasma prior to mixing with the exhaust gas and the entire mixture is passed through a second plasma reactor. See also European patent application 0 366 876 B1 published May 12, 1993, and the '876 patent for injecting other reducing agents, i.e., ammonia, into the exhaust gas passing through the plasma.

All of these approaches pass the entire exhaust stream with or without a reducing agent through a plasma reactor. Energy is required to generate the plasma and because the entire exhaust stream is treated by the plasma, a significant amount of energy must be developed by the vehicle to produce the plasma. Early plasma units placed an electrical load on the vehicle approximately equal to a 10% fuel penalty. Further, the load is a constant horsepower drain. Thus, with the vehicle cruising or idling at minimal engine fuel usage, the drain to operate the reactor represents a higher fuel utilization than the 10% value. It makes little sense to operate the engine at a lean burn condition to produce an overall fuel savings of about 10% if that savings is used by the energy required to power a reactor to eliminate $NO_X$ emissions which are in significant quantities because the engine is operated lean. Recent developments in the reactors have led to published literature claims of less energy utilization. The fact remains that the entire exhaust gas stream must be passed through the plasma which must be sufficiently energetic to induce reactions with the gases passing through the plasma. The prior art plasma $NO_X$ reduction systems are inherently energy inefficient systems.

Apart from using the plasma to react with $NO_X$ in a manner which converts the $NO_X$ or allows further conversion of the $NO_X$ to $N_2$, plasma has been generated in air to react with or oxidize coke inherently produced by diesel engines. The '677 and the '876 patents illustrate plasma reactors burning soot with air introduced in a metallic bed situated in a plasma field, i.e., thermal plasma or a ferroelectric bed in the plasma, i.e., non-thermal plasma.

SUMMARY OF THE INVENTION

It is thus a principal object of this invention to provide an energy efficient selective reduction catalyst system capable of converting $NO_X$ emissions into $N_2$ when the engine is operated at lean air/fuel conditions by a highly reactive reducing gas and more specifically by the, utilization of a plasma to produce a highly reactive reducing gas.

This object along with other features of the invention is achieved in a system (method and apparatus) for converting noxious emissions in the exhaust stream produced by an internal combustion engine operating at lean air/fuel ratios into benign emissions which includes an arrangement that converts a portion of liquid engine fuel into a highly reactive mixture functioning as a gaseous reductant. The highly reactive mixture is introduced into the exhaust stream upstream of a reducing catalyst whereby a small quantity of fuel produced with little energy expenditure effectively disposes of oxides of nitrogen resulting from lean burn engine conditions.

In accordance with a particularly important feature of the invention, the reactive mixture is characterized as substantially comprising (i.e., more than 50%) one or more HC reductants selected from the group consisting of i) normal, unbranched aliphatics having a chain length where the number of carbon atoms per organic molecule is equal to or greater than 7, ii) olefins and iii) oxygenates. Branched aliphatic and aromatic organic molecules typically present in significant quantities when diesel fuel or fuel oil is injected into the exhaust stream are minimized.

In accordance with a more specific feature of the invention, a specific species of the reactive mixture can be generated having a significant quantity (which may be less than 50%) of short chain HC, such as oxygenated organic molecules whereby the reactive mixture is able to permeate conventional catalyst beds having microporous crystallite structures such as catalysts containing zeolites to significantly increase the contact area of the catalyst and improve the efficiency of the catalyst to reduce oxides of nitrogen to free nitrogen. The low weight or short chain oxygenated organic molecules having few carbon atoms (i.e. 3) would include at least one oxygen atom for every three carbon atoms to produce reactive reducing compounds.

In accordance with the broad inventive concept of the invention several arrangements can be used to produce the highly reactive mixture such as a conventional cracking unit producing short chain HC molecules which are further reacted with oxygen over an oxidation catalyst to produce the reactive mixture. However, an especially important feature of the invention is the utilization of a non-thermal plasma reactor which is particularly suited to generate the highly reactive mixture in the presence of oxygen in an effective and an energy efficient manner. In fact, the efficiencies of the plasma reactor for generating a reducing gas and its suitability for use in the harsh environment which the vehicle is exposed to, provide a stand alone inventive feature even if the plasma reactor was operated to simply produce a reducing agent which would parallel the reactivity of conventional reducing agents generated from the engine fuel and not the highly reactive reducing mixture discussed above.

In accordance with another aspect of the invention, the fuel is diesel fuel and a carrier gas having some oxygen content is admitted with the fuel into the non-thermal plasma reactor chamber. The oxygen has a high probability for disassociation within the plasma with the result that oxygen atoms are simultaneously incorporated into organic molecules produced by the dissociation of the fuel oil caused in good part by the plasma. The organic molecules thus produced are to a significant extent short chain, unbranched, reactive organic molecules which are generated in a most energy efficient manner.

In accordance with another feature of the invention, the non-thermal plasma reactor chamber includes spaced electrodes and a bed of dielectric particles between the spaced electrodes so that the reaction chamber is a dielectric barrier plasma reaction chamber with the plasma generated by an AC potential thus avoiding arc discharge occurrences otherwise requiring sophisticated electronic circuits sensing and controlling voltage pulsing to the reaction chamber.

In accordance with yet another feature of the invention, the carrier gas is either a portion of the exhaust gas (i.e., EGR) or air whereby coking within the pellet bed is avoided by the presence of oxygen in the carrier gas which can react with any free carbon over a large effective surface area resulting from the dielectric bed.

In accordance with another specific feature of the invention, the dielectric particles in the bed not only cause a uniform plasma throughout the bed but may be optionally coated with oxidation catalysts to speed the desired reactions.

In accordance with an important system feature of the invention, the plasma reactor can simply receive the oxygen and fuel oil to produce the reactive material as stated above or optionally, a partial oxidation catalyst may be provided upstream of the plasma reactor to trim the reactive mixture to a desired composition or optionally a thermal cracking unit can be provided downstream of the plasma reactor such that a small sized plasma reactor with oxygen will further reduce the diesel fuel while forming the reactive gas material whereby a number of different systems with specific attributes can be configured utilizing the benefits obtained in a reducing gas produced by free radical oxidation reactions caused by the plasma reactor.

It is a general object of the invention to produce from diesel and like fuels, a highly reactive, reducing gas for use in an SCR catalyst system.

It is another object of this invention to provide a system, method and apparatus, for reducing $NO_X$ emissions created by diesel engines by using diesel fuel a) so that separate tanks do not have to provided on the vehicle for a reducing gas and/or b) a minimal amount of fuel is used to produce the reducing gas because of the highly reactive nature of the reducing gas produced by the invention.

It is yet another object of the invention to provide a system for cracking diesel fuel and/or long chain HC, by a plasma reactor to produce a highly reactive gas mixture.

An important general object of the invention is to provide a plasma reactor through which fuel and a carrier gas are passed to produce a reducing agent for an SCR catalyst system.

Yet another more specific object of the invention is the provision of a plasma reactor for cracking of diesel fuel in a plasma reactor which avoids coke.

Another specific but important object of the invention is a system (method and apparatus) which utilizes a plasma reactor to produce from diesel fuel a highly reactive reducing gas characterized by a short chain molecular structure able to permeate a catalyst bed to achieve high $NO_X$ reduction efficiencies thereby permitting less fuel to be used as a reducing gas when compared to other conventional arrangements using diesel fuel as a reducing gas in an SCR system.

A more specific object of the invention is the provision of an SCR system for removing noxious emissions produced by lean burn engines which uses a plasma reactor to produce a reducing agent having desired reactive organic molecular structures by generating strong energetic plasmas on a minor portion of the engine's fuel without imposing excessive energy loads on the engine.

A more subtle but important object of the invention is to generate a highly reactive reducing gas for internal combustion engines operating at lean burn conditions whereby downstream $NO_X$ catalysts can be developed or existing catalysts can be utilized without the deactivation or thermal degradation concerns which must currently be addressed.

An important object of the invention is the utilization of a carrier gas with diesel fuel in a plasma reactor to produce a highly reactive reducing gas at lower temperatures than required for conventional thermal cracking of diesel fuel.

A more subtle but important object of the invention is to provide, from the engine's fuel, a highly reactive reducing gas mixture for use in an SCR system which is able to maintain its reactivity notwithstanding the harsh vehicular environment, especially the cold temperature limits, which it is subjected to.

These objects and other features of the invention will become apparent to those skilled in the art from the following Detailed Description of the Invention taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE PREFERRED EMBODIMENT

Figure 1:
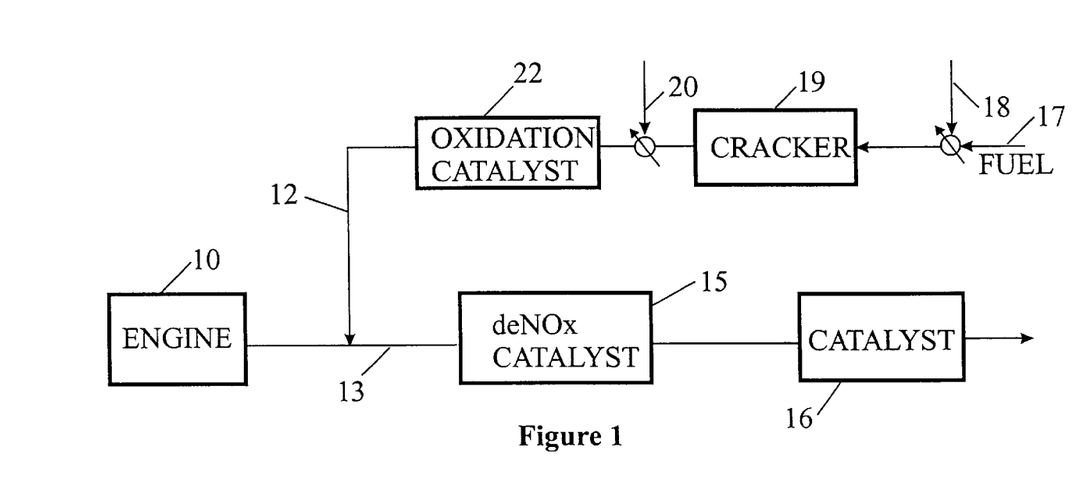
FIG. 1 is a general schematic of the system components of the invention in its broad sense.

Referring now to the drawings wherein the showings are for the purpose of illustrating a preferred embodiment of the invention only and not for the purpose of limiting the same, there is illustrated in schematic form in FIG. 1 the components of the invention in its broad form. An internal combustion engine whether of the diesel or gasoline fuel type, is indicated by block 10. Engine 10 is operated lean or with a "lean-burn" engine fuel strategy. As indicated in the Background, gasoline engines with lean-burn strategies indicate an overall fuel savings of 10% when compared to gasoline engines which use fuel control strategies which cycle the engine about stoichiometric. Although diesel engines operate at significantly higher air-to-fuel ratios (A/F) than gasoline powered engines, for definitional purposes a "lean" engine as used herein and in the claims is an engine that operates at an A/F ratio such that the nitrogen oxide emissions cannot be continuously treated by conventional three way catalysts (TWC). Conventional TWCs are able to treat gasoline powered engines using fueling strategies that cycle lambda (A/F / A/F necessary to produce stoichiometric combustion) at lean conditions as high as 1.05.

Referring still to FIG. 1, this invention introduces a reducing gas having a particular reactive mixture through a reactive mixture duct 12 into the exhaust gas stream in exhaust gas stream duct 13. The reactive mixture and the exhaust gas stream are passed over a $deNO_X$ reducing catalyst 15 whereby $NO_X$ is converted to free or elemental nitrogen, $N_2$ and the stream is then passed over a second oxidizing catalyst 16 for oxidizing any unconverted emissions such as HC and CO. The benign gaseous emissions are then exhausted to atmosphere. Reducing and oxidizing catalyst 15, 16 can be formed into one catalytic converter or be different coatings on the same monolithic block. The invention as described thus far is a conventional SCR system with the exception that the reactive mixture in duct 12 is highly reactive and ideally suited for reducing $NO_X$ and reducing catalyst 15.

Reference should be had to the article entitled Thermal Cracking of Higher Paraffins, cited above and incorporated herein by reference. The authors cracked hexadecane at pressure from 1–21 atmospheres at temperature of 500° C. and analyzed the cracked products produced to determine if the products correlated to the radical chain theory. According to the radical chain theory, small alkyl radicals accumulate to a steady state concentration and remove hydrogen atoms from paraffin molecules leaving a large radical which rapidly decompose ultimately regenerating the small radical which continues the chain. According to simple radical theory, the large primary alkyl radicals continue to split off ethylene until they are reduced to methyl or ethyl radicals and appear in the final product as methane or ethane. (A final product of methane and ethane, however, would constitute an inactive HC reductant for $NO_X$. The article is referenced for background discussion of classical cracking reaction theory relevant to the invention.) Further, the article notes certain carbon radicals do not isomerize whereas other do, but the isomerizations do not form branch chain radicals from the straight chains. The data shows a high proportion of low carbon numbered products produced in the cracking of hexadecane. As noted in the Secondary Fuel injection article, cited above and incorporated by reference herein, diesel fuel and air can be passed at elevated temperature over a partial oxidation catalyst to produce acetaldehyde or formaldehyde which exhibits improved $NO_X$ reduction in a silver aluminate catalyst.

In accordance with the broad concept of the invention, a reactive mixture somewhat similar to that produced in the preferred embodiment, can be produced by passing a liquid fuel from a fuel duct 17 mixed with air as a carrier gas from a carrier duct 18 through a cracking unit 19 which could be a zeolite catalyst at an elevated temperature to produce the desired short chain organic molecules as described in the *Thermal Cracking* article. A metered quantity of air at air duct 20 is then added to the cracked fuel and the mixture is passed over an oxidation catalyst 22 to provide formulation of desired aldehydes and ketones making up a portion of the reactive mixture in duct 12. Oxidation catalyst 22 as well as catalyst 16 is a base metal oxide such as an oxide of copper, cobalt, chromium, cerium, etc., or a noble metal catalyst containing palladium or platinum supported on $Al_2O_3$, $TiO_2$, $CeO_2$ etc. By initially cracking the fuel and subsequently passing the fuel with the metered amount of oxygen over the oxidation catalyst, a higher percentage of aldehydes can be obtained than if the air and fuel were admitted simultaneously to an oxidation catalyst at an elevated temperature. Further, if an excessive amount of air in duct 18 was mixed with fuel and inputted into cracking unit 19, aldehydes as formed in oxidation catalyst 22 with the cracked fuel would not be produced if only cracking unit 19 was used.

The reactive gas mixture of the invention may be best defined by reference to the graphs illustrated in FIGS. 7, 8, 9 and 10. FIGS. 7–10 show the ability of various classes of pure HCs which can be produced from fuel oil to reduce $NO_X$. The $NO_X$ conversion percentage is plotted on the y-axis and the temperature of the exhaust gas at the inlet for the catalyst is plotted on the x-axis for each graph. The exhaust gases were passed over a Pt/Zeolite lean $NO_X$ catalyst (reducing catalyst 15) and all HC reductants were run at approximately the same C/N (carbon/nitrogen) ratio. In each graph, the activity of the HC classes investigated is compared to the reducing activity of No. 2 diesel fuel injected into the exhaust stream at the catalyst inlet. The $NO_X$ conversion reactivity for No. 2 fuel oil for each graph is shown by the trace passing through triangles and designated by reference numeral 100.

Figure 9:
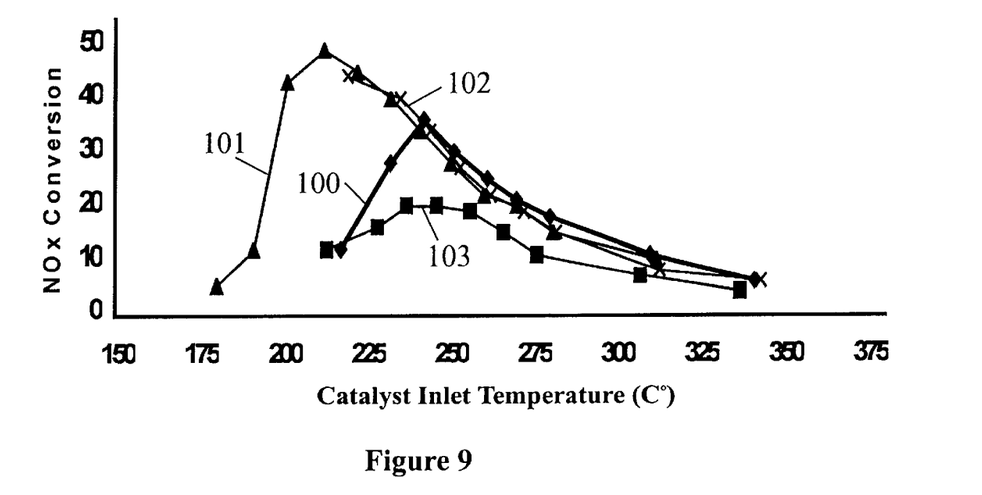
FIG. 9 is a plot similar to FIGS. 7 and 8 showing $NO_X$ conversion percentages for long chain, normal or unbranched aliphatic HCs; and, FIG. 10 is a plot similar to FIGS. 7, 8 and 9 showing $NO_X$ conversion percentages for branched aliphatic HCs.

Referring first to FIG. 9, the test data plotted shows that normal or unbranched aliphatic HCs are very good reductants as long as the chain length is greater than C7, i.e., the organic molecules have more than 7 carbon atoms. In FIG. 9, the reactivity of dodecane (C12) is shown by the plot passing through triangles designated by reference numeral 101. The reactivity of N-hexadecane (C16) is shown by the plot passing through X's designated by reference numeral 102. The reactivity of N-heptane (C7) is shown by the plot passing through squares designated by reference numeral 103. Testing has clearly indicated that propane (C3) is inactive because of its stability to oxidation and the fact that a 3-carbon chain provides insufficient heat of absorption for good affinity to a catalyst surface. Ethane and methane would be even worse. Decane and dodecane, on the other hand, are very good reductants. These long chain alaphatics are desirable for their reactivity even though they may have a down side of condensability at low ambient temperatures. It should also be noted that Fisher-Tropsch liquids would be expected to be very good reductants.

Figure 7:
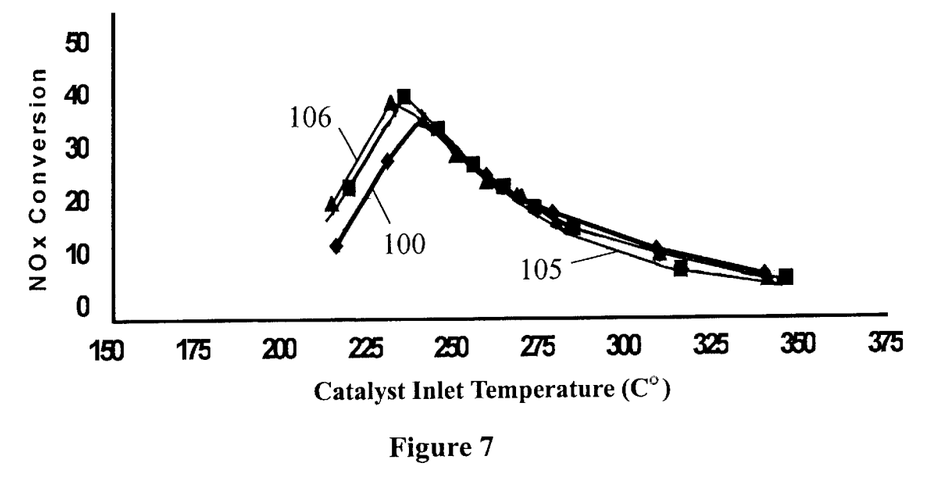
FIG. 7 is a plot showing $NO_X$ conversion percentages of olefin HCs as well as No. 2 diesel fuel for various catalyst inlet temperatures.

Referring now to FIG. 7, the plots shown therein indicate that olefins and oxygenates are good reductants. In FIG. 7, the reactivity of propylene (C3) is illustrated by the plot passing through squares designated by reference numeral 105. The reactivity of 1-octene (C3) is shown by the plot passing through triangles designated by reference numeral 106. Not shown in FIG. 7 for drawing clarity purposes are plots showing the reactivity of 1-propanol (C3) and 2-propanol (C3) which would fall in a family of curves between propane plot 105 and the No. 2 fuel oil plot 100. The plots in FIG. 7 support the conclusion that olefins are good reductants regardless of chain length with the possible exception of ethylene. Olefins are highly oxidizable and the double bond gives them affinity for catalyst surfaces. Propylene has been one of the key HC reductants in studies reported in the literature and it is demonstrated as a good reductant in the test data reported in FIG. 7. Testing of longer olefin, 1-octene as shown in plot 106 shows it to be the equivalent propylene. Oxygenates are also good reductants. Testing 1- and 2-propanol (not shown in FIG. 7) show it to be essentially the same as propylene trace 105. The hydroxyl group makes the oxygenate adsorbable at the catalyst surface. It is also possible that propanol simply dehydrates to propylene at the catalyst surface or that propylene oxidizes so that they both give the same active species. Less experimentation has been performed with aldehydes and ketones, but they are expected to produce similar results as that illustrated in FIG. 7.

Figure 10:
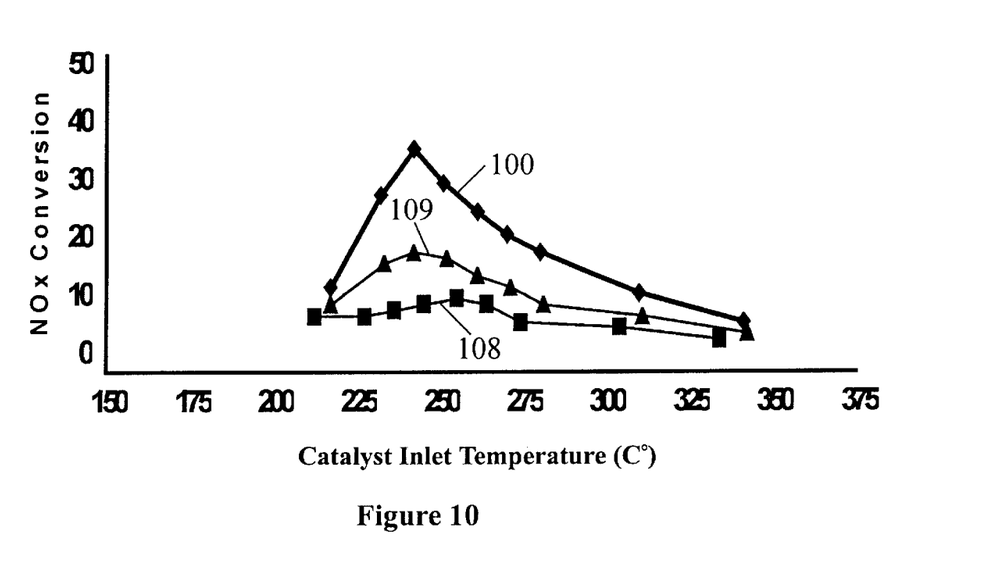

Referring now to FIG. 10, the plots shown therein demonstrate that branched alaphatic HCs are poor reductants. In FIG. 10, iso-octane (C8) is shown by the plot passing through squares designated by reference numeral 108. Reactivity of heptamethyl-nonane (C16) is shown by the trace passing through triangles designated by reference numeral 109. The branched alaphatic HCs along with cyclic alaphatics are prevalent in diesel fuel. These are the HC classes that especially need conversion or breakdown to more active HC species as provided for in the present invention.

Figure 8:
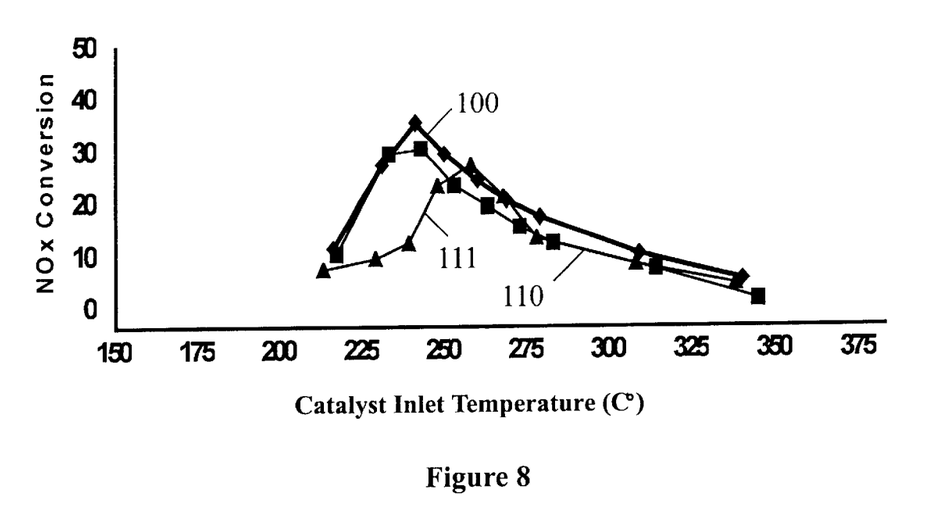
FIG. 8 is a plot showing $NO_X$ conversion percentages of aromatic HCs as well as No. 2 diesel fuel for various catalyst inlet temperatures.

Referring now to FIG. 8, the reducing activity of HC aromatics is demonstrated. In FIG. 8, the reactivity of O-xylene (C8) is shown by the plot passing through squares indicated by reference numeral 110. The reactivity of ethylbenzene (C8) is shown by the plot passing through triangles and indicated by reference numeral 111. FIG. 8 illustrates that HC aromatics are not the best HC reductants because of their stability although they are much better than the branched alaphatics discussed with reference to FIG. 10. Aromatic HCs also absorb well on the catalyst surface so they can be positioned where they can be effectively utilized. The down side is the tendency of aromatics to form coke which then foul the catalyst surface. Conversion of aromatics, especially poly-aromatics, to more active HC reductants is desirable.

In summary of the graphs illustrated in FIGS. 7–10, the reactive mixture produced in the invention is characterized as substantially comprising, i.e., more than 50%, one or more classes of HC reductants selected from the group consisting of i) normal, unbranched alaphatics having a chain length for the number of carbon atoms per molecule is equal to or greater than 7, ii) olefins with the possible exception of ethylene and iii) oxygenates. Branched alaphatics and aromatic HC reductants which are typically present when fuel oil is injected into the exhaust gases in significant quantities are minimized.

Figure 2:
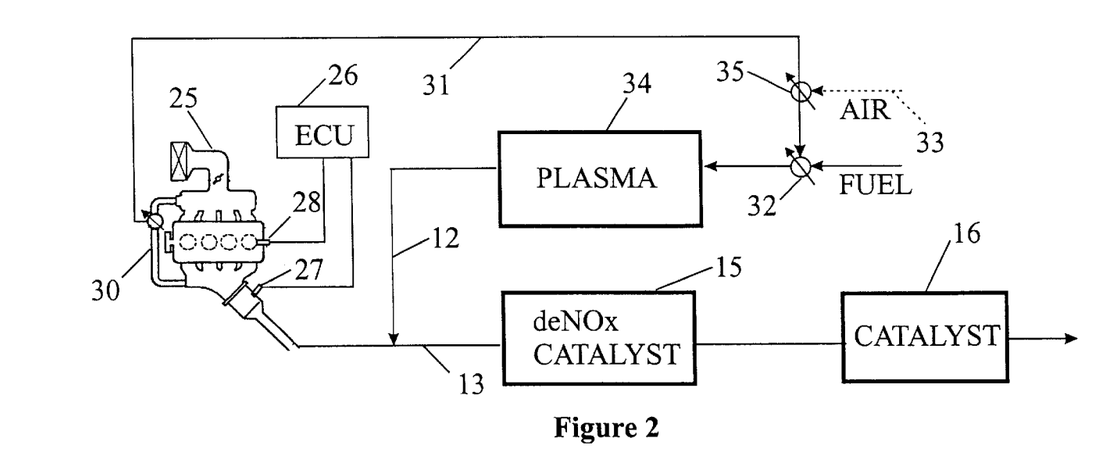
FIG. 2 is a schematic of the system components of the preferred embodiment of the invention.

While FIG. 1 illustrates the broad inventive concept of a reactive mixture formed, in part, from an oxygenated hydrocarbon feed stock, FIG. 2 illustrates the preferred embodiment of the invention utilizing a plasma reactor to generate the reactive mixture. While the invention is suitable for gasoline as well as diesel engines, the preferred embodiment of FIG. 2 is specific to a diesel engine 25 utilizing high grade diesel fuel such as No. 2 distillate fuel oil or its common equivalents. Diesel engine 25 is under the control of a conventional, programmable engine control unit, or ECU, 26. As is well known, ECU 26 receives input from a number of sensors such asa temperature sensor illustrated schematically for drawing clarity by reference numeral 27. After receiving sensor inputs, ECU 26 interpolates the data and performs programmed routines to generate a number of signals outputted to various actuators such as actuator 28 which controls, for example, the fuel injectors within engine 25. Specific to the invention, ECU performs conventional open loop control for each engine by mapping routines using look-up tables and data taken by a number of sensors, such as those indicative of temperature, oxygen content of the products of combustion, fueling, speed, etc. to determine the $NO_X$ content in the products of combustion, exhaust gas temperature, exhaust gas space velocity, etc. while engine 25 operates. When commercial $NO_X$ sensors are developed, ECU 26 will use the sensed $NO_X$ content of the products of combustion in place of the mapped routines. It is to be understood that the control of the system described herein is effected by ECU 26 or by a separate command module interconnected with ECU 26. In particular, ECU 26 will determine from the existing $NO_X$ content in the products of combustion (mapped or sensed) and other variables the signals to be sent to actuators controlling metering valves and the like described herein which, in turn, control the make up and quantity of the reactive mixture.

Engine 25 is equipped with a conventional exhaust gas recirculation system designated by reference numeral 30. A slip stream of the exhaust gas in the EGR loop is variably metered on line 31. The system of FIG. 2 is similar to the system illustrated in FIG. 1 in that a reactive mixture through reactive mixture duct 12 is introduced into the exhaust gas stream in exhaust gas stream duct 13 upstream of reducing catalyst 15. Any emissions not converted in reducing catalyst 15 are converted in oxidizing catalyst 16. Oxidation catalyst 16 can be a catalyst of the type described for oxidation catalyst 22.

Reducing catalyst 15 is preferably a $deNO_X$ catalyst or a lean catalyst. Currently, lean $NO_X$ catalysts are of two types: 1) low temperature lean $NO_X$ catalysts which are platinum based (Pt-based) and 2) high temperature lean $NO_X$ which have base metal/zeolite compositions, for example Cu/ZSM-5. The Pt in the low temperature type 1 catalyst is best atomically dispersed and would produce an amorphous and not crystalline structure. The Pt catalyst does not have to have a zeolite present to be active but Pt/zeolite catalysts are better and appear to have better selectivity against formation of $N_2O$ as a byproduct than other catalysts, i.e., Pt/alumina. Zeolite alone (e.g. H-ZSM-5) has some activity for $NO_X$ reduction but is not a good lean $NO_X$ catalyst. When exchanged with copper it constitutes an active catalyst. However, the assignee has determined that the copper does not have to be ion-exchanged and a single admixture of $Cu_2O$ and H-ZSM-5 produces just as good a catalyst. While the above fairly defines a reducing catalyst for lean engine, the invention can have application to emission control systems which utilize conventional $NO_X$ absorber catalysts, i.e., having an absorbing component such as an alkaline in combination with a TWC. For definitional purposes, "reducing catalyst" can mean conventional $NO_X$ absorbing catalysts as well as lean catalyst and a "lean reducing catalyst" can mean catalysts of the two types discussed above.

As shown in FIG. 2, a carrier gas on EGR line 31 is metered such as by valve 32 with diesel fuel into a non-thermal plasma reactor 34. In the preferred embodiment, the carrier gas as shown is a slip stream of the exhaust gas, preferably taken from the vehicle's EGR system 30. Carrier gas from EGR system 30 is utilized because it has a limited amount of oxygen, when compared to air. The oxygen content of the carrier gas can be precisely controlled by optionally metering air as shown by dashed arrow 33 at an optional metering valve 35 with the EGR gas. Alternatively, the carrier gas could comprise air or any other gas mixture having some amount of oxygen. In addition, the presence of other emissions such as HC in the EGR stream contribute to the reactivity of the reactive mixture although this is not significant.

Preferably, valve 32 meters the carrier gas and fuel at appropriate pressure to produce a fine mist of gas/fuel droplets which enter plasma reactor 34. That is, the fuel droplets are preferably minimized in size. It is potentially possible for occasional large fuel droplets to enter plasma reactor 34 and leave as smaller fuel droplets. The reactive mixture is defined herein as a gas but it is to be understood that the use of "gas" herein (and in the claims) includes insignificant or trace amounts of small liquid fuel droplets. If such droplets are present, they will evaporate when mixed with the exhaust gas and do not affect the gaseous mixture formed in the plasma reactor 34.

In accordance with the broader theory of the invention, plasma reactor 34 can comprise any known system for generating a non-thermal plasma by any number of methods such as electrical fields, electron beams, and irradiation with electro magnetic energy of appropriate intensity and wave length. Non-thermal plasma reactors which could be employed in the invention include any of the following known reactors: i) corona discharge, ii) microwave radiation, iii) ultra violet radiation, iv) radio frequency discharge, v) dielectric barrier, vi) electrified pack bed, vii) flow discharge, viii) surface discharge and ix) plasma jet. Reference can be had to U.S. Pat. No. 5,746,984 to Hoard; U.S. Pat. No. 5,711,147 to Vogtlin et al. U.S. Pat. No. 5,440,876 to Bayliss et al.; and European Patent Publication No. 0,366,876 B1, all of which are incorporated herein by reference, for a more detailed explanation of the theory, functioning and application of non-thermal plasma reactors than that described herein.

Generally speaking, the plasma reactor is connected to the power supply which generates a high voltage electrical field which in turn causes an acceleration of electrons. The electrons accelerate rapidly within the electrical field and strike or impact other molecules resulting in disassociation and ionization of gas molecules within their path. The zone of the ionized molecules and electrons is commonly referred to as a "streamer". If the streamer passes across the gap between the electrodes, arcing or arc discharge occurs, which, if severe enough, will short the reactor. Conventional control techniques pulse the power so the voltage is stopped before the streamer crosses the gap. Conventional control techniques typically employ in the pulsing circuit sensing means for detecting imminent arc discharges and control of the voltage pulses accordingly.

Importantly, the electron impact results in disassociation and ionization of material between the electrodes and the energetic electrons produce free radicals, ions and additional electrons which, in turn, react with the carrier gas and fuel to oxidize, reduce and/or decompose fuel and gas molecules. The plasma reactor is sufficiently warm so that when the fuel is introduced into the reactor it evaporates into gaseous molecules. The fuel molecules immediately undergo free radical chemistry reactions with a significant amount of ozone and atomic oxygen present in the reactor. The oxygen electron and ion collisions with the fuel molecules introduce an unsatisfied valency which cleaves the fuel molecule somewhere down its chain thus breaking up or reducing the molecular fuel chain. A number of reactions are simultaneously occurring within the plasma. Aromatic rings are broken and opened up. The ends of the fuel molecules are broken or nibbled away producing aldehydes. Some cracking of the overall molecular fuel chain occurs. The net result is reduced molecular weight and the addition of oxygen. All of the reactions are occurring within the plasma at relatively low temperatures, significantly below that of conventional thermal cracking units. There is at least a three-fold benefit to the reactive mixture. First, the reducing gas is highly reactive and more so than what can be obtained by simply spraying diesel fuel into an exhaust gas; second, the low weight molecular structure provides significant enhancement to the reducing catalyst when compared to prior art arrangements which simply pass a reducing gas and exhaust stream over the surface of the catalyst; and third, the oxygenated reducing gas is able to withstand harsh cold operating environments which otherwise cause i) condensation of elements in the reductants of conventional SCR systems in turn adversely affecting the reduction reactions over the reducing catalyst, and ii) additional, practical operational problems.

Figures 5, 6:
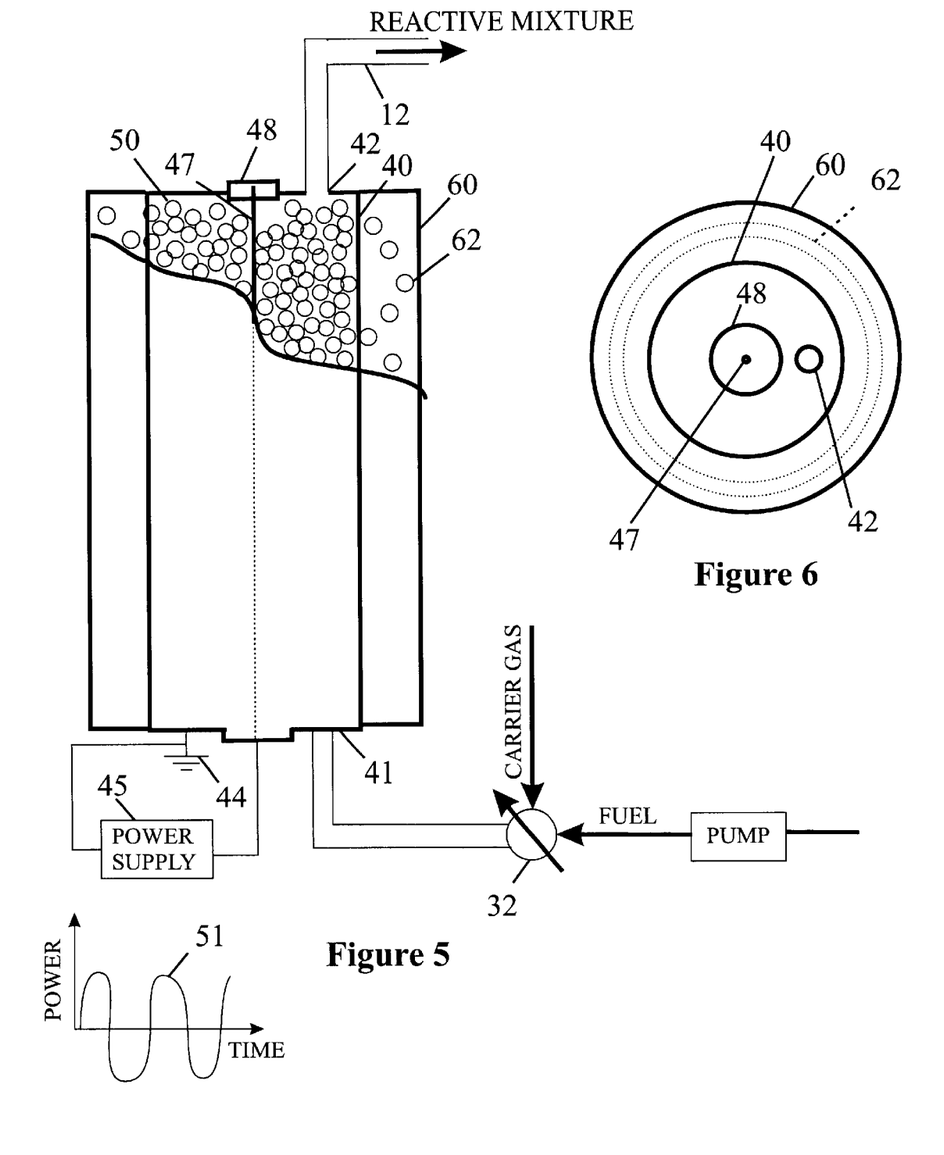
FIG. 5 is a schematic plan view of a plasma reactor suitable for use in the invention.
FIG. 6 is a top view of the reactor schematically illustrated in FIG. 5.

In the preferred embodiment, the preferred non-thermal plasma reactor is a dielectric barrier reactor such as schematically shown in FIGS. 5 and 6. Referring now to FIGS. 5 and 6, reaction chamber 40 can be of almost any symmetrical configuration but preferably is tubular or cylindrical in shape as shown. Reaction chamber 40 has an inlet 41 at one end for receiving the mixture of fuel and carrier gas and a spaced outlet 42 at its other end for discharging the reactive mixture through reactive mixture duct 12. Reaction chamber 40 is connected to ground 44 and functions as an electrode to which power supply 45 is connected and is similar in function to a cathode in a vacuum ion furnace. The second electrode is shown as a wire 47 connected to power supply 45 and extending between insulators 48 in reaction chamber 40 and is similar to the anode in a vacuum ion discharge furnace.

Within reaction chamber 40 is a bed of dielectric particles. In the preferred embodiment, the dielectric particles are zeolites or alternatively (and somewhat preferred), the dielectric particles comprise ferro-electric particles such as barium titanate. The particles are placed in a bed and, in the preferred embodiment, are of generally small uniform size. (It is within the concept of the invention to vary the size of the particles through the bed. For example, by means of screens or grids at various bed length positions, different sized particles can be used as the reactive mixture and gas/fuel travels through the bed. Also, inlets and outlets can be staggered along the bed length.) The dielectric bed is preferred because, among other reasons, it generates a uniform plasma throughout the bed. As is well known, the dielectric particles 50 function by analogy as capacitors which, when fully charged, prevent the streamers from progressing to the walls of reaction chamber 40 causing arc discharge but in the process of being charged, give off electrons which contribute to the reactions discussed above. An AC current supplied by power supply diagrammatically illustrated as reference numeral FIG. 51, is sufficient to alternately charge and discharge the capacitive nature of dielectric particles 50 as a function of the frequency of the AC cycle. This arrangement alleviates any sophisticated pulsing/arc detect circuit otherwise required in plasma reactors which do not have dielectric particle beds or electrified beds. While such controls are suitable in industrial applications, it is believed they do not lend themselves well to a vehicular environment. Additionally, AC power supply 45 lends itself readily to power increases on demand to vary the plasma intensity, if needed. At the same time, because of the low volume of fuel being processed, there is little energy drain on the vehicle. It is conceptually possible that the load placed on engine 25 by power supply 45 is equivalent to the load placed on the vehicle by its present electrical system. This is an insignificant power drain.

Importantly, dielectric particles 50 effectively prevent the formation of petroleum coke when the fuel oil reacts within plasma reaction chamber 40. Dielectric particles 50 provide a large effective surface area over which free carbon that forms coke must pass. Accordingly, molecular reactions will likely occur with any free carbon by active oxygen forming volatile materials. Plasma reaction chamber 40 can be continuously operated in the preferred embodiment without having to regenerate the bed to rid the bed of coke deposits.

Surrounding reaction chamber 40 is a heater chamber 60 containing electrically powered heater element 62 for raising and/or maintaining reaction chamber 40 at a desired set temperature. Alternatively, a portion of the exhaust gas can be circulated through heater housing 60 for heating reaction chamber 40 or a combination thereof can be provided. Use of electrical heating elements is preferred.

As noted with respect to the discussion had for FIG. 1, the temperature at which diesel fuel is cracked is a function of the space velocity and the catalyst over which the fuel is passed, but, typically speaking, the fuel is cracked at about 500° C. The temperature of the plasma reactor is significantly reduced. For example, the temperature of reaction chamber 40 does not exceed approximately 300° C. and preferably does not exceed temperatures above 200° C. One of the primary purposes of heater 62 is to insure the viscosity of the fuel is at a set level as it enters reaction chamber 40 where it can be readily evaporated to gaseous form. If the heat from reaction chamber 40 is insufficient to control the fuel viscosity, heater element 62 will be extended to wrap about the fuel duct leading to reaction chamber 40. As noted above, the oxygen in the carrier gas readily ionizes to react with free carbon to avoid formation of coke. The dielectric particles provide a large surface area to assure the reaction. Importantly, the intensity of the plasma and the ratio of the carrier gas and fuel can be variably controlled depending on the $NO_X$ emissions produced by engine 25. In effect, while the preferred embodiment of the invention simply sets the carrier gas and fuel at a set ratio with a set plasma intensity to produce a highly reactive mixture, the invention contemplates a variable control depending on engine conditions (mapped or sensed) to produce a specific reactive gas mixture especially suited for $NO_x$ reduction based on actual engine operation and emissions.

As noted above, reducing catalyst 15 is broadly defined as a lean reducing catalyst as well as $NO_x$ absorber catalyst. However, particularly preferred reducing catalysts are composites of zeolites with base metals or platinum (i.e., precious metals group). The zeolites within the preferred group can be any of the conventional zeolites but preferred is ZSM-5. While the metal may or may not be crystalline, the zeolites have a crystalline structure exhibiting porosity. Reference can be had to assignee's U.S. Pat. Nos. 4,961,917 and 5,516,497 incorporated by reference herein. The crystalline structures of zeolites exhibits a complex pore structure having more or less recurring connections, intersections and the like in dimensional planes. Preferred zeolites for use in NO catalyst 15 are those which have relatively large diameter pores interconnected within all three crystallographic dimensions, typically about 7–8 Angstroms. However, the invention will function with any zeolite catalyst bed having a porosity of 2–3 angstroms to about 8–10 angstroms. An important aspect of a specific feature of the invention is that the reactive gas mixture can be adjusted within the definition of the reactive gas mixture to produce a significant quantity of unbranched, short chain organic molecules which are within the porosity size of the NO catalyst such that a substantial portion of the reactive mixture is able to permeate the catalyst bed increasing the reactive area of the catalyst to enhance $NO_x$ reduction. Specifically, the short chain organic molecules are HC oxygenates resulting, in good part, from conversion of branched aliphatic and aromatic by plasma reactor 34. However, the reactive mixture improves the SCR system even for longer chain components of a size which will not permeate the zeolite.

In general summary, the invention utilizes a plasma reactor to generate a reducing gas from diesel fuel used by the vehicle. The plasma reactor efficiently produces the reducing gas in the harsh vehicular operating environment for use in an SCR system and no additional steps are needed. That is a subsequent plasma treatment of the exhaust gas is not needed. The reducing catalyst and producing gas is conventional. However, the plasma reactor is ideally suited to produce the desired reactive mixture defined above. This mixture is more reactive than reducing agents conventionally produced from diesel fuel. The system using the reactive gas mixture can use any type of reducing catalyst but a lean catalyst is preferred. Additionally, a species of the reactive gas mixture can be produced by the plasma reactor characterized by having a significant amount of short chain organic molecules able to permeate the porosity of the zeolite bed. A still more specific inventive aspect is that the short chain molecules are oxygenated organic molecules having no more than about 3 carbon atoms per molecule.

In accordance with another related but somewhat distinct aspect of the invention, the reactive gas mixture, as defined above, can be produced by a non-plasma arrangement in which the diesel fuel is reacted in separate stages (i.e., thermal cracking followed by oxidation reactions) to produce the desired mixture.

Figure 3:
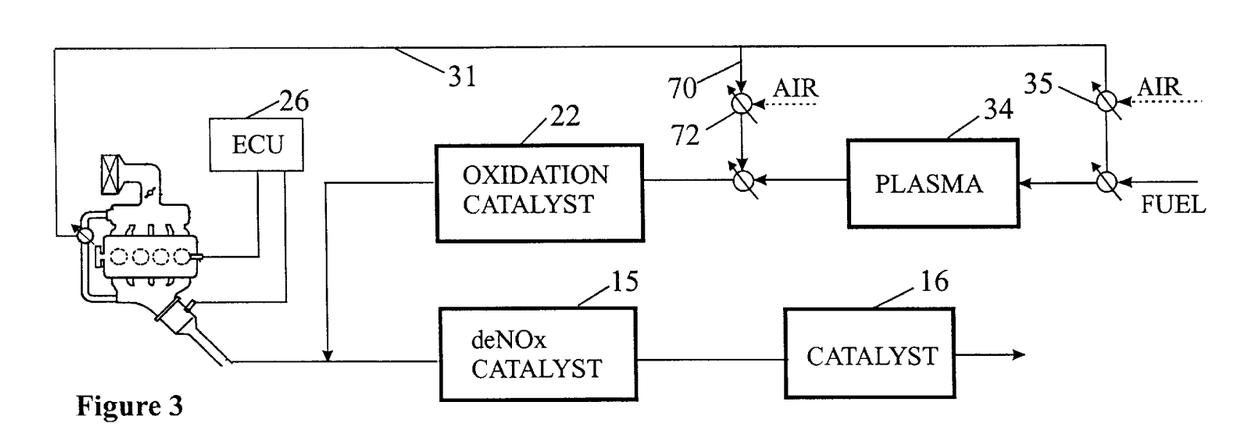
FIG. 3 is a schematic of the system components of an alternative embodiment of the invention.
Figure 4:
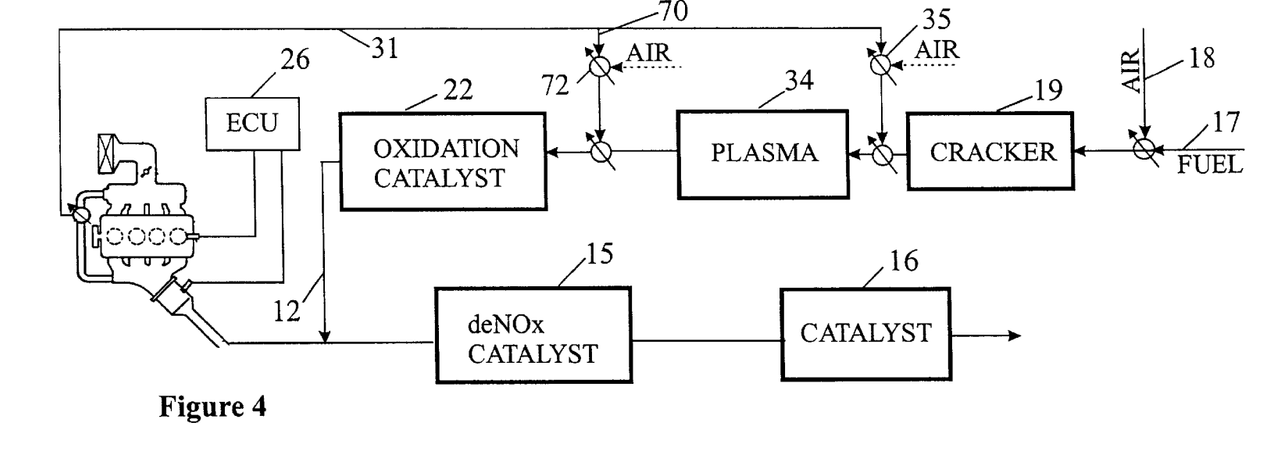
FIG. 4 is a schematic of the system component of a still further alternative embodiment of the invention.

Alternative systemic arrangements utilizing the invention are disclosed in FIGS. 3 and 4 and the reference numerals used in describing the components of the system with respect to FIGS. 1 and 2 will apply to designate the same components when used in FIGS. 3 and 4.

Referring now to FIG. 3, the system illustrated in FIG. 2 is modified by the addition of partial oxidation catalyst 22 downstream of plasma reactor 34 and upstream of nitrogen oxide catalyst 15. Oxidation catalyst 22 functions to trim the reactive mixture produced in plasma reactor 34 to produce a substantial amount of desired reactive gas composition. This is accomplished by adding a set quantity of oxygen, either by the addition of EGR gas at duct branch 70, or alternatively, air (or other gas containing oxygen) or alternatively, a metered quantity of air and EGR gas by metering valve 72. Plasma reactor 34 is sized accordingly.

Referring now to FIG. 4, a still further embodiment of the invention is disclosed in that conventional thermal cracking unit 19 is applied upstream of plasma reactor 34. Oxygen is metered to the cracked fuel leaving cracking unit 19 and the cracked fuel with added oxygen will be subjected to the plasma produced in plasma reactor 34. The oxygen can be metered into the cracked fuel either by the direct injection of air, or EGR or combination of EGR and air. The plasma produces the oxidated reactive mixture as described with reference to FIG. 2. Because the HC chain is cracked in cracking unit 19, the size of plasma reactor unit 34 can be reduced in the FIG. 4 embodiment. The reactive gas mixture leaving plasma reactor 34 can be directly metered to the exhaust stream through duct 12. Alternatively, partial oxidation catalyst 22 can be inserted downstream of plasma reactor 34 and upstream of NO catalyst 15 as shown in FIG. 4 and function for the purposes discussed with reference to FIG. 3.

In summary of this invention, the hydrocarbon reductant is processed in a dedicated plasma reactor or plasma reactor stage to render it a more suitable feedstock for participation in the catalyzed $NO_x$ reduction.

The plasma reactor will importantly serve to cleave the aromatic, long chain, and branched long chain diesel fuel constituents into shorter fragments of greater volatility and of sufficiently reduced molecular dimensions to allow their ready participation.

Catalyst activity for $NO_x$ reduction will be considerably enhanced if the hydrocarbon feedstock is an oxygenated material, particularly a ketone or aldehyde. The fuel processor operating conditions are manipulated to maximize the yield of these more reactive materials. This can be done in the plasma reactor itself, particularly with plasma reactors which contain particulate dielectric materials. An alternative means to accomplish the desired conversion of diesel fuel or the like into more volatile and reactive components is to employ one or more catalytic reaction stages as part of the fuel processor. The plasma stage would convert the hydrocarbon into a form which would then be brought to the final produce mix composition by the action of the catalytic stage(s).

The fuel processing of this type offers the considerable advantage that only a very small gas volume containing the hydrocarbon reductant need be treated in the plasma reactor rather than the entire engine exhaust stream. Because the hydrocarbon stream is relatively small, high plasma energy densities and electrical heating of the fuel to accomplish initial evaporation are practical without an onerous consumption of engine output energy. This advantage can be exploited if it is desired to operate one or more stages of the fuel processor at temperatures well above ambient or the internal combustion engine exhaust temperature.

Should it be desired to do so, the plasma fuel processing and any related catalytic stages could readily be incorporated as stages within a larger plasma reactor which treats the entire exhaust stream.

The invention has been described with reference to a preferred and alternative embodiments. Obviously, modifications and alterations will occur to those skilled in the art upon reading and understanding the Detailed Description of the Invention set forth herein. It is intended to include all such modifications and alterations insofar as they come within the scope of the present invention.

Having thus defined the invention, it is claimed:

1. A system for converting noxious emissions in the exhaust stream produced by an internal combustion engine operating at lean air/fuel ratios into non polluting emissions comprising:
   a) reducing means for converting a portion of liquid engine fuel substantially into a gaseous reductant, said reducing means including a non-thermal plasma reaction chamber generating a non-thermal plasma through which said fuel passes;
   b) means to introduce said gaseous reductant into said exhaust stream at a rate correlated to the $NO_X$ emissions produced by said engine;
   c) a reducing catalyst downstream of said introduction means for converting said $NO_X$ to $N_2$; and,
   d) an oxidation catalyst downstream of said plasma reaction chamber and upstream of said introducing means and said reducing catalyst and means to introduce oxygen into the gaseous mixture leaving said plasma reaction chamber whereby an oxygenated reactive gas mixture is produced.

2. A system for converting noxious emissions including $NO_X$ produced by a diesel internal combustion engine comprising;
   a) a non-thermal plasma reaction chamber having a first ground electrode and a second insulated electrode and an electrical power supply with control to supply a voltage between said first and second electrodes, an inlet in fluid communication with the space between said electrodes and an outlet in fluid communication with the space between said electrodes and spaced from said inlet;
   b) a pump for injecting a metered portion of the fuel used in the diesel engine with a carrier gas containing oxygen to said inlet;
   c) a duct in fluid communication with said exhaust gases and said outlet for metering gaseous reductants produced by cracking said fuel in the presence of oxygen within said non-thermal plasma reaction chamber into said exhaust gases;
   d) a first reducing catalyst downstream of said duct receiving said exhaust gases with said gaseous reductants for reducing said $NO_X$ emissions to benign emissions;
   e) a second catalyst for converting any noxious emissions in said exhaust gases not reduced to harmless emissions in said first catalyst; and,
   f) a third catalyst having an inlet in fluid communication with said fuel and an outlet in fluid communication with said inlet of said reactor chamber; said third catalyst being a cracking catalyst for partially reducing said fuel to a shorter chain of gaseous hydrocarbons.

3. The system of claim 2 further including an oxidation catalyst downstream of said plasma reaction chamber and upstream of said first reducing catalyst; a valve upstream of said oxidation catalyst for metering oxygen into said gaseous reductants produced by said plasma reaction chamber prior to passing through said oxidation catalyst.

4. In a SCR system for converting nitrogen oxides produced by an internal combustion engine operating at lean air to fuel ratios into benign emissions, the improvement comprising:
   means to produce a reactive reducing gas mixture having 50% or more reactive hydrocarbons by composition, said reactive hydrocarbons including at least one class selected from the group consisting of i) unbranched aliphatics having at least 7 carbon atoms per molecule, ii) olefins and iii) oxygenates, said means to produce including
   a) a thermal cracking unit for cracking engine fuel with air into a gas having short chain organic molecules; and
   b) means to meter oxygen with said gas of short chain organic molecules;
   c) an oxidation catalyst downstream of said cracking unit over which said oxygen and short chain molecules pass in contact therewith for producing said reducing gas.

5. The improvement of claim 4 wherein said thermal cracking unit includes a non-thermal plasma reactor and said means to meter oxygen including a carrier gas containing oxygen.

6. The improvement of claim 5 wherein said plasma reactor is a dielectric barrier plasma reactor.

7. The improvement of claim 5 wherein said means to produce further includes means to meter oxygen with the gases exiting said non-thermal plasma reactor downstream of said oxidation catalyst and a partial oxidation catalyst downstream of said plasma reactor over which said oxygen and said gases exiting said non-thermal plasma reactor pass in contact therewith.

8. The improvement of claim 4 wherein said means to produce further includes said thermal cracking unit upstream of and in fluid communication with a non-thermal plasma reactor and means for introducing oxygen into the gaseous cracked fuel downstream of said non-thermal plasma reactor.

* * * * *